United States Patent
Al-Farhood et al.

(10) Patent No.: US 11,673,996 B2
(45) Date of Patent: Jun. 13, 2023

(54) COPOLYESTER TAPE

(71) Applicant: SABIC GLOBAL TECHNOLOGIES B.V., Bergen op Zoom (NL)

(72) Inventors: Bander Al-Farhood, Geleen (NL); Zahir Bashir, Geleen (NL); Satishkumar Mahanth, Geleen (NL); Roshan Kumar Jha, Geleen (NL); Kummetha Raghunatha Reddy, Geleen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 429 days.

(21) Appl. No.: 16/648,251

(22) PCT Filed: Sep. 7, 2018

(86) PCT No.: PCT/EP2018/074137
§ 371 (c)(1),
(2) Date: Mar. 18, 2020

(87) PCT Pub. No.: WO2019/063264
PCT Pub. Date: Apr. 4, 2019

(65) Prior Publication Data
US 2020/0239628 A1 Jul. 30, 2020

(30) Foreign Application Priority Data
Sep. 26, 2017 (EP) .................................. 17193172

(51) Int. Cl.
| | | |
|---|---|---|
| C08G 63/672 | (2006.01) | |
| B29C 48/00 | (2019.01) | |
| C08G 63/80 | (2006.01) | |
| C08G 63/82 | (2006.01) | |
| C08G 63/86 | (2006.01) | |
| C08J 5/18 | (2006.01) | |
| B29K 67/00 | (2006.01) | |
| B29K 71/00 | (2006.01) | |
| B29K 105/00 | (2006.01) | |

(52) U.S. Cl.
CPC ........ C08G 63/672 (2013.01); B29C 48/0018 (2019.02); C08G 63/80 (2013.01); C08G 63/826 (2013.01); C08G 63/866 (2013.01); C08J 5/18 (2013.01); B29K 2067/003 (2013.01); B29K 2071/02 (2013.01); B29K 2105/0085 (2013.01); C08J 2367/02 (2013.01)

(58) Field of Classification Search
USPC ......... 528/190, 193, 194, 271, 272; 428/220
See application file for complete search history.

(56) References Cited

U.S. PATENT DOCUMENTS

| | | | | |
|---|---|---|---|---|
| 2,988,782 A | | 6/1961 | Parrish et al. | |
| 3,416,952 A | * | 12/1968 | McIntyre | C08G 63/6884 8/115.6 |
| 3,512,920 A | * | 5/1970 | Dunlap | D06M 15/5075 524/45 |
| 4,493,870 A | * | 1/1985 | Vrouenraets | B32B 27/12 428/419 |
| 2007/0225474 A1 | * | 9/2007 | Determan | C08J 11/24 528/272 |

FOREIGN PATENT DOCUMENTS

WO      2017108540 A1     6/2017

OTHER PUBLICATIONS

International Search Report; International Application No. PCT/EP2018/074137; International Filing Date: Sep. 37, 2018; dated May 16, 2019; 3 pages.
Written Opinion; International Application No. PCT/EP2018/074137; International Filing Date: Sep. 7, 2018 dated May 16, 2019; 5 pages.

* cited by examiner

Primary Examiner — Terressa Boykin
(74) Attorney, Agent, or Firm — Cantor Colburn LLP

(57) ABSTRACT

Provided is a tape including a composition having a copolyester including polymeric units derived from ethylene glycol and terephthalic acid or a diester thereof and >0.50 and <5.00 wt % of polymeric units with regard to the total weight of the polyester derived from an oligomeric dihydroxy compound having a number average molecular weight of >500 g/mol and <5000 g/mol. Such tape has an improved tensile-impact strength and a reduced proneness to splitting during weaving.

19 Claims, No Drawings

COPOLYESTER TAPE

CROSS REFERENCE TO RELATED APPLICATIONS

This application is a 371 of International Application No. PCT/EP2018/074137, filed Sep. 7, 2018, which is incorporated by reference in its entirety, and which claims priority to European Application Serial No. 17193172.8 filed Sep. 26, 2017.

The present invention relates to a copolyester tape. In particular, the invention relates to a copolyester tape having reduced tendency to splitting during processing of the tapes into woven fabric.

Polyesters are well-known products that for many years have found their application in an increasing array of products. A particular example of products where polyesters find their application is in uniaxially oriented tapes that are suitable for production of woven products. The present invention provides an improvement in tapes that are particularly suitable for use in such products.

Fabrics that are produced from polyester tapes can for example be used in the production of sacks for packaging of dry bulk food products including rice, grains and sugar, bags such as jumbo bags or big-bags for the packaging of industrial products, geotextiles such as used in roads and civil engineering, and as reinforcements in composite materials such as thermoplastic or thermoset composites. Polyester tapes may provide desired properties including transparency, gloss, tenacity, creep resistance and high service temperature that may render them particularly suitable for certain of such applications.

A common means of manufacturing such tapes is by way of melt extrusion to form a cast film of the polyester where the molten polyester exits the extruder via one or more die opening(s). A particularly practical method involves casting an amorphous polyester film onto a chill roller. The film is then slit in the longitudinal direction into a multitude of tapes using cutter blades, to result in a multitude of tapes, for example 100 or more. The tapes then may be heated to a temperature of above the glass transition temperature ($T_g$) up to about 100° C., and subjected to a unidirectional stretching step, where the stretching is performed in the machine direction. The machine direction is to be understood to be the direction in which the material exits the extruder die. This unidirectional stretching in the machine direction provides a molecular orientation to the polyester molecules that results in desirable mechanical properties for the high-strength tape fabrics. The stretched tapes may additionally be annealed in a heat setting step, which may be understood to increase the crystallinity and the thermomechanical properties.

The thus obtained uniaxially oriented tapes may subsequently be woven into a fabric in a circular or flat loom. At this stage, tapes according to the state of the art are prone to splitting in the weaving loom, thereby arresting the loom. This may occur due to sudden pulls and twists of the tape in the loom. While polyester tapes such as polyethylene terephthalate (PET) tapes are strong and stiff, they are brittle and susceptible to shattering when pulled suddenly, i.e. subjecting to tensile impact, producing splinters or fibrils. Such splinters or fibrils may clog the guides in the looms, causing its stoppage.

In order to reduce this phenomenon, which has a detrimental impact on the uniform quality of the obtained fabric as well as on process economics, from occurring, it has to be understood that the properties of the tape that play a part in this occurrence are the tensile-impact strength and the fracture surface. A tensile impact is a sudden pull along the longitudinal axis of the tape; a high tensile-impact strength reflects the tape's ability to withstand such tensile impacts. An undesirable fracture surface can be understood to be a surface where upon the occurrence of a fracture, splinters and fibrils are formed. A more desirable fracture surface shows a puckered appearance. The object of the present invention is thus to provide a polyester tape having an improved tensile-impact strength that demonstrate a desired fracture surface when fracturing during weaving occurs.

This is accomplished according to the present invention by a tape comprising a composition comprising a copolyester comprising polymeric units derived from ethylene glycol and terephthalic acid or a diester thereof and >0.50 and <5.00 wt % of polymeric units with regard to the total weight of the copolyester derived from an oligomeric dihydroxy compound having a number average molecular weight of >500 g/mol and <5000 g/mol.

Such tapes have improved mechanical properties such as an improved tensile-impact strength and can be produced in a more stable and productive manner as they demonstrate a reduced proneness to fracturing by splitting during the tape weaving.

It is preferred that the tape comprises >0.50 and <4.00 wt % of polymeric units derived from the oligomeric dihydroxy compound, more preferably >1.00 and <3.00 wt %, even more preferably >1.50 and <2.50 wt %.

It is preferred that the oligomeric dyhydroxy compound has a number average molecular weight of >500 g/mol and <3000 g/mol, more preferably >500 g/mol and <2500 g/mol, even more preferably ≥1000 g/mol and ≤2000 g/mol.

In certain embodiments, it is preferred that the tape comprises >0.50 and <4.00 wt % of polymeric units derived from the oligomeric dihydroxy compound, wherein the oligomeric dihydroxy compound has a number average molecular weight of >500 g/mol and <3000 g/mol, more preferably >500 g/mol and <2500 g/mol, even more preferably ≥1000 g/mol and ≤2000 g/mol. More preferably, the tape comprises >1.00 and <3.00 wt % of polymeric units derived from the oligomeric dihydroxy compound, wherein the oligomeric dihydroxy compound has a number average molecular weight of >500 g/mol and <3000 g/mol, more preferably >500 g/mol and <2500 g/mol, even more preferably ≥1000 g/mol and ≤2000 g/mol. Even more preferably, the tape comprises >1.50 and <2.50 wt % of polymeric units derived from the oligomeric dihydroxy compound, wherein the oligomeric dihydroxy compound has a number average molecular weight of >500 g/mol and <3000 g/mol, more preferably >500 g/mol and <2500 g/mol, even more preferably ≥1000 g/mol and ≤2000 g/mol. Even more preferably, the tape comprises >0.50 and <4.00 wt % of polymeric units derived from the oligomeric dihydroxy compound, wherein the oligomeric dihydroxy compound has a number average molecular weight of >500 g/mol and <2500 g/mol. Even more preferably, the tape comprises >1.00 and <3.00 wt % of polymeric units derived from the oligomeric dihydroxy compound, wherein the oligomeric dihydroxy compound has a number average molecular weight of >500 g/mol and <2500 g/mol.

The oligomeric dihydroxy compound may for example be a compound selected from a polyester polyol, a polyethylene glycol, a polypropylene glycol, a polytetrahydrofuran, or a polydimethyl siloxane. In a particular embodiment of the invention, the oligomeric dihydroxy compound is a polyethylene glycol. For example, the oligomeric dihydroxy compound may be a polyethylene glycol having a number average molecular weight of >500 g/mol and <5000 g/mol, preferably >500 g/mol and <3000 g/mol, even more preferably >1000 g/mol and <2000 g/mol.

The determination of the number average molecular weight is well known in the art and may for example be done in accordance with the method described in ISO 19929: 2017.

The copolyester may for example have a glass transition temperature ($T_g$) in the range of 60-75° C. Such glass transition temperature allows for a convenient and economical tape drawing operation. Preferably, the copolyester has a glass transition temperature in the range of 60-70° C. The glass transition temperature may for example be determined via differential scanning calorimetry (DSC) in the second heating run in accordance with ISO 11357-2 (2013).

The tapes according to the present invention in a preferred embodiment comprise ≥85.0 wt % of the copolyester, preferably ≥90.0 wt %, more preferably ≥95.0 wt %, even more preferably ≥98.0 wt %, with regard to the total weight of the tape.

The copolyester comprises polymeric units derived from ethylene glycol and terephthalic acid or a diester thereof. Preferably, the copolyester comprises ≥85.0 wt % of polymeric units derived from ethylene glycol and terephthalic acid or a diester thereof, more preferably ≥90.0 wt %, even more preferably ≥95.0 wt %, with regard to the total weight of the copolyester. Preferably, the copolyester comprises polymeric units derived from ethylene glycol and terephthalic acid or dimethyl terephthalate. Preferably, the copolyester comprises ≥85.0 wt % of polymeric units derived from ethylene glycol and terephthalic acid or dimethyl terephthalate, more preferably ≥90.0 wt %, even more preferably ≥95.0 wt %, with regard to the total weight of the copolyester. It is particularly preferred that the copolyester consists of polymeric units derived from ethylene glycol and terephthalic acid or a diester thereof and >0.50 and <2.50 wt % of polymeric units with regard to the total weight of the copolyester derived from an oligomeric dihydroxy compound having a molecular weight of >500 g/mol and <2500 g/mol.

The copolyester may in certain embodiments comprise a fraction of polymeric units derived from further comonomers. For example, the copolyester may comprise ≤14.5 wt %, preferably ≤12.5 wt %, more preferably ≤5.0 wt %, of polymeric units derived from isophthalic acid, naphthalenic acid, succinic acid, adipic acid, phthalic acid, glutaric acid, oxalic acid, maleic acid, 1,4-cyclohexanedimethanol, 1,3-propyleneglycol, 1,4-butyleneglycol, or combinations thereof, with regard to the total weight of the copolyester.

The copolyester that may be used in the tape according to the present invention preferably has an intrinsic viscosity of ≥0.50 dl/g and ≤2.50 dl/g, more preferably ≥0.55 and ≤1.50 dl/g, even more preferably ≥0.60 and ≤1.00 dl/g. Copolyesters having such intrinsic viscosity are particularly suitable in terms of processability, as they have a sufficiently high viscosity to ensure the tapes to have desired mechanical properties, whilst still having a sufficiently low viscosity to allow fast and stable tape production. The intrinsic viscosity may be determined in accordance with ASTM D2857-95 (2007).

The copolyester may be produced according to any method know in the art. For example, the copolyester may be produced by melt polycondensation or by melt polycondensation followed by solid state polycondensation. For melt polycondensation, a catalyst may be used. For example, antimony trioxide or antimony triacetate may be used as catalyst. For example, a quantity of ≤1000 ppm, preferably ≤500 ppm of catalyst with regard to the total weight of the copolyester may be used in the melt polycondensation.

The melt polycondensation may comprise a first step of an esterification and a subsequent step of polycondensation. The esterification is preferably performed at a pressure of 0.8-1.2 bar, at a temperature of 200-300° C. The esterified product may then be subjected to polycondensation at a pressure of ≤20 mbar, preferably ≤1.0 mbar. The temperature during polycondensation may for example be in the range of 220-300° C., preferably 250-300° C. The esterification and the polycondensation may be performed in the same reactor, or alternatively in separate reactors. The polycondensation may be continued until the copolyester that is formed has reached its target molecular build-up. For example, the polycondensation may be continued until the copolyester has reached an intrinsic viscosity of 0.5-2.5 dl/g.

Alternatively, the copolyester may be produced via a process involving melt polycondensation followed by solid state polycondensation. In such instance, the melt polycondensation is continued until the copolyester has reached an intrinsic viscosity that is not fully the target intrinsic viscosity, so in such case the copolyester has not reached its molecular build-up completely during the melt polycondensation. The product from the melt polycondensation may be solidified, for example in the form of granules or pellets, and subsequently subjected to solid-state polycondensation at a temperature between the glass transition temperature and the melt temperature of the copolyester. For example, the solid-state polycondensation may be performed at a temperature in the range of 180-230° C. The solid-state polycondensation is performed for such period until the target intrinsic viscosity of the copolyester, so the targeted molecular weight build-up, is achieved.

The intrinsic viscosity of the copolyester is to be understood as an indicator for the molecular build-up, or the polymerisation degree, of the copolyester.

The copolyester preferably has a carboxylic end-group content of ≤60 mmol/kg, as determined in accordance with ASTM D7409-15. More preferably, the copolyester has a carboxylic end-group content of ≤40 mmol/kg.

The copolyesters may comprise commonly used additives, including for example stabilisers such as heat stabilisers, antioxidants, and UV stabilisers, processing aids such as anti-blocking agents and electrostatic spinning agents, slip agents, colorants such as dyes and pigments, opacifiers, compatibilisers, catalyst deactivators, or combinations thereof. For example, anti-blocking agents may be added to reduce the tendency of the tape material to stick to itself when the tapes are wound onto tape bobbins or rolls. Such anti-blocking agents may be added to the resin during the polymerisation, or alternatively during a subsequent extrusion step, for example in the form of a masterbatch.

An anti-blocking agent in the context of the present invention may be understood to be a material that reduces the blocking and sticking of tapes, for instance immediately after the cutting or on the bobbins. Suitable anti-blocking agents that may be used with the tapes according to the present invention are for example calcium carbonate, titanium dioxide, barium sulphate, pentaerythritol tetrastearate, silica, or silicone oil, linear low density polyethylene, and fluorinated polymers. An amount of for example ≤10 wt %, preferably ≤5 wt %, more preferably ≤3 wt %, even more preferably ≤1 wt % of anti-blocking agent may be used. The use of such anti-blocking agent contributes to the possibility to produce tape bobbins at high speed, which still can be unwound easily into the loom when weaving.

In the context of the present invention, tapes may for example be films having a width of ≤0.5 mm. Preferably, the width of the tape according to the present invention is ≥0.7 mm, more preferably ≥0.8 mm, even more preferably ≥0.9 mm, even more preferably ≥1.0 mm. Preferably, the width of the tape is ≤100.0 mm, more preferably ≤50.0 mm, more preferably ≤35.0 mm, even more preferably ≤25.0 mm, even more preferably ≤20.0 mm, even more preferably ≤15.0 mm, even more preferably ≤10.0 mm, even more preferably ≤7.0 mm, even more preferably ≤5.0 mm, even more preferably ≤3.0 mm, even more preferably ≤2.0 mm.

For example, the tape may have a width of ≥0.5 and ≤100.0 mm, more preferably ≥0.5 and ≤50.0 mm, more preferably ≥0.5 and ≤20.0 mm, more preferably ≥1.0 and ≤20.0 mm, more preferably ≥1.0 and ≤10.0 mm, more preferably ≥1.0 and ≤5.0 mm.

The tapes may for example have a thickness of ≥5 μm, preferably ≥10 μm, more preferable ≥20 μm, even more preferably ≥30 μm, even more preferably ≥50 μm. The tapes may for example have a thickness of ≤2000 μm, preferably ≤1000 μm, more preferably ≤250 μm, even more preferably ≤100 μm, even more preferably ≤80 μm.

For example, the tapes may have a thickness of ≥5 μm and ≤2000 μm, preferably ≥10 μm and ≤1000 μm, more preferably ≥10 μm and ≤250 μm, even more preferably ≥20 μm and ≤100 μm, even more preferably ≥20 μm and ≤80 μm.

For example, the tapes may have a width of ≥0.5 and ≤100.0 mm and a thickness of ≥5 μm and ≤1000 μm, preferably a width of ≥1.0 and ≤50.0 mm and a thickness of ≥10 μm and ≤250 μm, more preferably a width of ≥1.0 and ≤20.0 mm and a thickness of ≥20 μm and ≤100 μm.

The thickness and width of the tape refers to the final thickness and width after unidirectional drawing.

The oriented, heat-set tapes preferably have a tenacity of ≥1090 N·m/kg (3 gf/denier). Such tapes may be suitable for weaving of woven tape fabrics.

In the context of the present invention, a film is to be understood to be a flat elongated body with a rectangular cross-section. The body commonly has a length dimension, i.e. the dimension in the machine direction, that is much greater than the cross-section dimensions. The longer axis of the cross-section is referred to as width and the shorter axis of the cross-section is referred to as the thickness.

The tape may for example be produced by a process involving a step of melt extrusion of the copolyester via a slit die to form a film, and solidification of the formed film on casting rollers to form an unoriented cast film. Such cast film may for example be cut in the longitudinal direction to form unoriented tapes. In the present context, unoriented tapes are to be understood as not having been subjected to a treatment to induce molecular orientation to the tapes.

In certain preferred embodiments, the tape of the present invention may be subjected to a uniaxial drawing, also referred to as stretching, in the longitudinal direction. This uniaxial drawing results in an orientation of the polymer molecules in the copolyester such that the mechanical properties are improved. Such uniaxial drawn tapes demonstrate uniaxial or unidirectional orientation. In the present context, orientation is to be understood as an indicator for a certain degree of axial alignment of the polymer molecules of the copolyester. Uniaxial drawing or stretching may also be referred to as unidirectional drawing or stretching.

The uniaxial drawing may for example be performed at a temperature of >60° C. and <100° C. It is preferred that the uniaxial drawing is performed at a temperature of >70° C. and <100° C., more preferably >70° C. and <90° C.

The tape may for example be stretched to a drawing ratio of >4 and <10, wherein the drawing ratio is the ratio of the length of the tape subsequent to stretching and the length of the tape prior to stretching. Preferably, the tape is stretched to a drawing ratio of >5 and <8.

After stretching, the tapes may be subjected to a heat-set treatment under tension. Such heat-set treatment may be performed in-line. Such heat-set treatment may be performed at a temperature of 140-170° C. This treatment may increase the crystallinity, resulting in an improvement of modulus and strength, and reduce the hot shrinkage tendency. This heat-set treatment tends to increase the brittleness and reduces the tensile-impact strength of the polyesters of the prior art. However, the tapes of the present invention demonstrate a reduction of these negative implications of the heat-set treatment, and show high retention of the tensile-impact strength and low brittle fracturing.

The tapes may be produced in a continuous process involving the steps in this order of:
melt extrusion to form a molten film;
film casting to form a solidified unoriented film;
cutting the film in the longitudinal direction to form unoriented tapes;
subjecting the unoriented tapes to a stretching step in the longitudinal direction to form unidirectionally oriented tapes; and
heat-setting the oriented tapes.

The cutting of the film may also be referred to as slitting the film.

The tapes may for example be wound onto tape bobbins or tape rolls. Such tape bobbins or rolls may be used in the weaving process to produce tape fabrics from the copolyester.

The copolyester as used in the tape of the present invention preferably is a thermoplastic copolyester. For example, the copolyester may be a poly(ethylene terephthalate) copolymer (PET).

Woven textiles produced using the tape of the present invention may for example be used in the production of large-volume heavy-duty bags, such as big-bags or flexible intermediate bulk containers. Such bags may for example have a volume of ≥500 l, or even >1000 l. Such bags may be used for filing with hot materials, such as bitumen. Such woven textiles may also for example be used in carpet backing, geo textiles, metallised fabrics, flexible electronics, and as reinforcing material in reinforced composites.

The invention will now be illustrated by the following non-limiting examples.

EXAMPLE 1

PET Homopolymer

A quantity of a PET homopolymer was prepared in a bench-scale setup involving an esterification step, a polycondensation step and a solid state polymerisation step.

The esterification was performed in a 25 l. bench-scale reactor with agitation. To the reactor vessel, 6917 g terephthalic acid, 3358 g ethylene glycol, 5.66 g antimony triacetate, and 0.5 g cobalt acetate were supplied under agitation at 100 rpm to form a feed paste. The temperature of the paste was increased to 250° C. under a pressure of 5 bar triggering the esterification reaction. Water was continuously removed during the esterification via a separation column of the reactor. Esterification occurred under continued agitation at 100 rpm. Upon completion of the esterification reaction, which was after 184 min, the pressure was reduced to atmospheric pressure. Subsequently, 0.6 g phosphoric acid was added to the reactor and allowed to mix with the esterification product for 3 min during which the temperature was increased to 260° C.

The polycondensation was subsequently performed in the same reactor vessel. During polycondensation the reactor was stirred at 60 rpm. The temperature was increased to 275° C. and the pressure reduced to 2 mbar over a period of 25 min. Polycondensation occurred with formation of ethylene glycol and water which were continuously removed. The reaction was allowed to continue until the stirrer torque reached 19 Nm, which was after 181 min, upon which stirring was stopped and the reactor pressurized to atmospheric with nitrogen. The formed polymer, which has an intrinsic viscosity of 0.64 dl/g, was evacuated from the reactor via an outlet nozzle to form strands which were cooled in a water bath and cut to form amorphous granules.

The granules were subsequently crystallised and then subjected to solid state polymerisation (SSP) in a 50 kg tumble drier. The granules were introduced to a rotating drier and temperature increased to 110° C. to dry the granules, and further increased to 170° C. and kept for 2 hours to induce crystallisation, under a flush of 2 m$^3$/h of nitrogen to drive out moisture. Then the temperature was further increased to 210° C. and a vacuum of 1 mbar was applied. Solid state polymerisation was allowed to take place for 16 hours under nitrogen flush of 0.5 m$^3$ /h to drive out moisture and reaction gases. After 16 hours, the PET homopolymer having an intrinsic viscosity of 0.84 dl/g was collected which is further referred to as sample 1.

EXAMPLE 2-5

PET Copolymers

Using the same setup as in the preparation of sample 1, PET copolymers were prepared in examples 2-5 that differed from example 1 in that:
In example 2, 160 g of PEG-1000 was added together with the other ingredients before esterification; the esterification time was 190 min; polycondensation time was 183 min, resulting in a PET copolymer comprising 2 wt % of units derived from PEG-1000 (sample 2);
In example 3, 240 g of PEG-1000 was added together with the other ingredients before esterification; the esterification time was 188 min; polycondensation time was 130 min, resulting in a PET copolymer comprising 3 wt % of units derived from PEG-1000 (sample 3);
In example 4, 160 g of Priplast 1838 was added after polycondensation to and intrinsic viscosity (I.V.) of about 0.4 dl/g by breaking the vacuum, addition of the Priplast 1838 and re-applying of the vacuum to continue the polycondensation; the esterification time was 118 min; polycondensation time was 95 min, resulting in a PET copolymer comprising 2 wt % of units derived from BPA (sample 4); and
In example 5, 160 g of BPA was added together with the other ingredients before esterification, resulting in a PET copolymer comprising 2 wt % of units derived from BPA (sample 5).

In examples 2, 3, 4 and 5 above, the I.V. after melt polycondensation was about 0.64 dl/g, and after SSP the pellets reached an I.V. of 0.84 dl/g.

Materials:
PEG-1000 is a poly(ethylene glycol) having a number average molecular weight of 1000 g/mol;
Priplast 1838 is a polyester polyol having a number average molecular weight of 2000 g/mol, CAS reg. nr. 856170-63-3, obtainable from Croda;
BPA is bisphenol-A-bis(2-hydroxyethyl)ether, number average molecular weight 316 g/mol, CAS reg nr. 901-44-0.

Of each of the samples, sufficient material was produced to prepare sample tapes. The sample tapes were produced by preparation of a cast film by melt extrusion of each of the samples through a slit die at 280° C. followed by a quench cooling on chilled cast rollers at 15° C., to obtain a film having a thickness of 100 μm and a width of about 15 cm. All films were transparent except the film of the copolymer of example 4, which was translucent.

The cast films were cut into rectangular pieces from the centre-line portion of the film. The sample pieces were subjected to unidirectional drawing in the longitudinal direction to achieve a drawing rate of 5.2, i.e. an increase in sample length of 5.2 times, in a Zwick tensile machine equipped with a hot cabinet. The drawing speed was 50 mm/min for all samples. The final thickness of the tape after unidirectional drawing was 20-30μm. The final width was 2-5 mm. All samples were heat set under tension at the temperatures shown in table II for 1 min.

Material properties of the tapes of each of the sample polymers were determined as presented in table II below.

TABLE II

| Sample | $T_m$ | TI | TMod | Split fractures | $T_g$ | $T_{draw}$ | $T_{heat\ set}$ |
|---|---|---|---|---|---|---|---|
| 1 | 253 | 1977 | 4.20 | 4/10 | 81 | 100 | 240 |
| 2 | 250 | 2915 | 4.63 | 0/10 | 63 | 85 | 220 |
| 3 | 250 | 2350 | 4.06 | 4/10 | 61 | 85 | 220 |
| 4 | 249 | 2800 |  | 0/10 | 74 | 95 | 240 |
| 5 | 248 | 2000 |  | 5/10 | 75 | 95 | 240 |

Wherein:
IV is the intrinsic viscosity of the polyester as determined in accordance with ASTM D2857-95 (2007), expressed in dl/g;
$T_m$ is the melt temperature of the polyester as determined via differential scanning calorimetry (DSC) as the peak melt temperature in the second heating run in accordance with ISO 11357-3 (2011), expressed in ° C.;
TI is the tensile-impact strength as determined in accordance with ASTM D1822-06 heat set as 240° C., expressed in kJ/m$^2$;
TMod is the tensile modulus as determined in accordance with ASTM D882-12, expressed in GPa;
Split fractures is the number of tape samples out of a set of 10 samples used in the tensile-impact strength test that demonstrated split fractures;
$T_g$ is the glass transition temperature in ° C. as determined via differential scanning calorimetry in accordance;
$T_{draw}$ is the temperature in the hot cabinet during the drawing step, in ° C.;
$T_{heat\ set}$ is the temperature applied during the heat-setting step, in ° C.

The above results demonstrate that the tapes according to the present invention demonstrate an increased tensile-impact strength, coupled with and improved splitting resistance and retention of modulus. This can be observed from comparison of the inventive sample 2, a copolymer polyester comprising 2 wt % of comonomer where the comonomer has a number average molecular weight of 1000 g/mol, with sample 1, the PET homopolymer. The presence of 2 wt % of such comonomer in the PET can be observed to result in an improved tensile-impact strength and reduced proneness to splitting.

The invention claimed is:

1. A tape comprising a composition comprising:
a copolyester comprising polymeric units derived from ethylene glycol and terephthalic acid or a diester thereof and >0.50 and <5.00 wt % of polymeric units with regard to the total weight of the polyester derived from an oligomeric dihydroxy compound having a number average molecular weight of >500 g/mol and <5000 g/mol.

2. The tape according to claim 1, wherein the oligomeric dihydroxy compound is selected from a polyester polyol, a polyethylene glycol, a polypropylene glycol, a polytetrahydrofuran, or a polydimethyl siloxane.

3. The tape according to claim 1, wherein the oligomeric dihydroxy compound is a polyethylene glycol.

4. The tape according to claim 1, wherein the polyester has an intrinsic viscosity as determined in accordance with ASTM D2857-95 (2007) of >0.50 and <2.50 dl/g.

5. The tape according to claim 1, wherein the tape has a width of ≥1.0 and ≤50.0 mm and a thickness of ≥10 μm and ≤250 μm.

6. The tape according to claim 1, wherein the tape is unidirectionally oriented along the longitudinal axis.

7. The tape according to claim 1, wherein the tape is stretched to a drawing rate of >4 and <10, wherein the drawing rate is the ratio of the length of the tape subsequent to stretching and the length of the tape prior to stretching.

8. A process for the production of a tape according to claim 1, wherein the process comprises the following steps in this order:
melt extrusion to form a molten film;
film casting to form a solidified unoriented film;
cutting the film in the longitudinal direction to form a plurality of unoriented tapes;
subjecting the unoriented tapes to a stretching step in the longitudinal direction to form unidirectionally oriented tapes; and
heat-setting the oriented tapes.

9. The process according to claim 8, wherein the stretching step is performed at a temperature of >70° C. and <90° C.

10. The process according to claim 8, wherein the tape is produced at a stretching speed of >100 m/min.

11. The process according to claim 8, wherein the unidirectionally oriented tapes are subjected to a heat-setting step at a temperature in the range of 140-250° C.

12. A woven article comprising the tape according to claim 1.

13. The woven article according to claim 12 wherein the woven article is a bag having a volume of ≥500 l.

14. The process according to claim 8,
wherein the stretching step is performed at a temperature of >70° C. and <90° C.;
wherein the tape is produced at a stretching speed of >100 m/min; and
wherein the unidirectionally oriented tapes are subjected to a heat-setting step at a temperature in the range of 140-250° C.

15. The tape according to claim 1,
wherein the oligomeric dihydroxy compound is selected from a polyester polyol, a polyethylene glycol, a polypropylene glycol, a polytetrahydrofuran, or a polydimethyl siloxane;
wherein the polyester has an intrinsic viscosity as determined in accordance with ASTM D2857-95 (2007) of >0.50 and <2.50 dl/g;
wherein the tape is unidirectionally oriented along the longitudinal axis; and
wherein the tape is stretched to a drawing rate of >4 and <10, wherein the drawing rate is the ratio of the length of the tape subsequent to stretching and the length of the tape prior to stretching.

16. The tape according to claim 15, wherein the tape has a width of ≥1.0 and ≤50.0 mm and a thickness of ≥10 μm and ≤250 μm.

17. The tape according to claim 15, wherein the oligomeric dihydroxy compound is a polyethylene glycol.

18. A tape comprising a composition comprising:
a copolyester comprising polymeric units derived from ethylene glycol and terephthalic acid or a diester thereof; and
>0.50 and <5.00 wt % of polymeric units with regard to the total weight of the polyester derived from an oligomeric dihydroxy compound having a number average molecular weight of >500 g/mol and <5000 g/mol;
wherein the polyester has an intrinsic viscosity as determined in accordance with ASTM D2857-95 (2007) of >0.50 and <2.50 dl/g;
wherein the tape has a width of ≥1.0 and ≤50.0 mm and a thickness of ≥10 μm and ≤250 μm;
wherein the tape is unidirectionally oriented along the longitudinal axis; and
wherein the tape is stretched to a drawing rate of >4 and <10, wherein the drawing rate is the ratio of the length of the tape subsequent to stretching and the length of the tape prior to stretching.

19. The tape according to claim 1, wherein the oligomeric dihydroxy compound has a number average molecular weight of 1,000 g/mol to 2,000 g/mol.

* * * * *